United States Patent [19]

Tsuru

[11] Patent Number: 5,296,254

[45] Date of Patent: * Mar. 22, 1994

[54] METHOD OF PRODUCING A FILTERING MATERIAL

[75] Inventor: Sumiaki Tsuru, Tokyo, Japan

[73] Assignee: Bestex Kabushiki-Kaisha, Tokyo, Japan

[*] Notice: The portion of the term of this patent subsequent to Sep. 1, 2009 has been disclaimed.

[21] Appl. No.: 896,042

[22] Filed: Jun. 8, 1992

[30] Foreign Application Priority Data

Jun. 6, 1991 [JP] Japan .................................. 3-63903

[51] Int. Cl.$^5$ .......................... B05D 5/00; A62B 11/00
[52] U.S. Cl. ...................................... 427/2; 427/244; 427/428; 427/427
[58] Field of Search .................. 427/2, 244, 414, 194, 427/202, 180, 428, 426, 434.2, 427; 128/206.19; 210/504

[56] References Cited

U.S. PATENT DOCUMENTS

| | | | |
|---|---|---|---|
| 3,019,127 | 1/1962 | Czerwonka et al. | 427/202 |
| 4,168,326 | 9/1979 | Broemer et al. | 427/2 |
| 4,645,757 | 2/1987 | Hjertén | 514/54 |
| 4,659,617 | 4/1987 | Fujii et al. | 264/220 |
| 4,990,163 | 2/1991 | Ducheyne et al. | 427/2 |
| 5,041,252 | 8/1991 | Fujii et al. | 264/176.1 |
| 5,043,069 | 8/1991 | Brandon et al. | 427/244 |
| 5,124,177 | 6/1992 | Kasmark, Jr. et al. | 427/244 |
| 5,128,169 | 7/1992 | Saita et al. | 427/2 |
| 5,143,752 | 9/1992 | Nakajima et al. | 427/244 |

Primary Examiner—Shrive Beck
Assistant Examiner—Diana Dudash
Attorney, Agent, or Firm—Wenderoth, Lind & Ponack

[57] ABSTRACT

To produce a filtering material for adsorptively capturing very fine particles such as fungus, pollen, virus, bacteria or the like at a high efficiency, an aqueous treatment solution is first prepared by dissolving porous apatite particles of 0.5 to 40% by weight, preferably, 0.5 to 30% by weight and a water soluble glucan of 0.5 to 15% by weight in water. A sheet-shaped raw material is then coated with the treatment solution with the aid of a rotating drum of which part is always dipped in the treatment solution, and thereafter, the sheet-shaped raw material having the treatment solution coated thereon is dried. Alternatively, an aqueous treatment solution prepared by dissolving only a water soluble glucan of 0.5 to 25% by weight in water may be substituted for the aforementioned aqueous treatment solution. In this case, after a sheet-shaped raw material is coated with the treatment solution, porous apatite particles are deposited on the sheet-shaped raw material by employing a dispersing process or a spraying process before the treatment solution coated on the sheet-shaped raw material is kept still wet. Subsequently, the sheet-shaped raw material having the treatment solution coated thereon and the porous apatite particles deposited thereon is dried.

9 Claims, 1 Drawing Sheet

METHOD OF PRODUCING A FILTERING MATERIAL

BACKGROUND OF THE INVENTION

1. Field of the Invention

The present invention relates generally to a method of producing a filtering material practically employable in various application fields including a sanitary material such as a mask or the like, a deodoring filter to be incorporated in various kinds of deodoring units and a foodstuff packing material having sterilizing and deodoring functions. More particularly, the present invention relates to a method of producing a filtering material having a capability of adsorptively capturing very fine infectious or antigenous particles such as virus, bacteria or the like.

2. Description of the Related Art

The applicant common to the present invention has already proposed a method of producing a filtering material capable of adsorptively capturing virus under Japanese Patent Application Nos. 278487/1990 and 29301/1991. An outline of each of the prior inventions is such that a predetermined quantity of porous apatite particles and a predetermined quantity of water soluble glucan are dispersively dissolved in water to prepare an aqueous treatment solution, a sheet-shaped raw material is dipped in the treatment solution or it is coated with the same by employing a spraying process so as to allow it to be impregnated with the treatment solution, and thereafter, the sheet-shaped raw material having the treatment solution coated thereon is dried.

In spite of the already proposed methods of which excellent filtering property has been proven by repeated practical use, the applicant additionally conducted a series of development works for a filtering material having a more excellent filtering property and has reached the present invention.

SUMMARY OF THE INVENTION

An object of the present invention is to provide a method of producing a filtering material at a higher efficiency.

Another object of the present invention is to provide a method of producing a filtering material having an improved performance of adsorptively capturing very fine particles such as fungus, pollen, virus, bacteria or the like.

According to one aspect of the present invention, there is provided a method of producing a filtering material wherein the method comprises a first step of preparing an aqueous treatment solution by dispersively dissolving porous apatite particles of 0.5 to 40% by weight and a water soluble glucan of 0.5 to 15% by weight in water, a second step of allowing a sheet-shaped raw material to be adhesively coated with the aqueous treatment solution with the aid of rolling means, and a third step of drying the sheet-shaped raw material having the aqueous treatment solution adhesively coated thereon. To prevent a product of filtering material from breaking due to shortage of flexibility during practical use thereof for a long time, it is preferable that the content of the porous apatite particles in the aqueous treatment solution is set to 0.5 to 30% by weight.

Usually, the rolling means is prepared in the form of a rotating drum of which part is always dipped in a treatment solution vessel in which the aqueous treatment solution is contained. The drum is required to rotate at the circumferential speed equal to or more than the traveling speed of the sheet-shaped raw material.

According to other aspect of the present invention, there is provided a method of producing a filtering material wherein the method comprises a first step of preparing an aqueous treatment solution by dissolving a water soluble glucan of 0.5 to 25% by weight in water, a second step of allowing a sheet-shaped raw material to be adhesively coated with the treatment solution, a third step of allowing a predetermined quantity of porous apatite particles to be adhesively deposited on the sheet-shaped raw material before the aqueous treatment solution adhesively coated on the sheet-shaped raw material is completely dried, and a fourth step of drying the sheet-shaped raw material having the aqueous treatment solution adhesively coated thereon and the porous apatite particles adhesively deposited thereon.

Usually, the second step is achieved such that the sheet-shaped raw material is adhesively coated with the aqueous treatment solution by dipping the sheet-shaped raw material in the aqueous treatment solution and then upwardly drawing the former away from the latter.

Alternatively, the second step may be achieved such that the sheet-shaped raw material is adhesively coated with the aqueous treatment solution by spraying the aqueous treatment solution over one surface of the sheet-shaped raw material.

In addition, the second step may be achieved such that the sheet-shaped raw material is adhesively coated with the aqueous treatment solution by allowing a rotating drum to come in contact with the sheet-shaped raw material. In this case, a part of the rotating drum is always dipped in the aqueous treatment solution, and the circumferential speed of the rotating drum is set to be equal to or higher than the traveling speed of the sheet-shaped raw material.

Usually, the third step is achieved such that the porous apatite particles are adhesively deposited on the sheet-shaped raw material having the aqueous treatment solution adhesively deposited thereon by dispersing the porous apatite particles over one surface of the sheet-shaped raw material.

Alternatively, the third step may be achieved such that the porous apatite particles are adhesively deposited on the sheet-shaped raw material having the aqueous treatment solution adhesively deposited thereon by spraying the porous apatite particles over one surface of the sheet-shaped raw material.

Other objects, features and advantages of the present invention will readily become apparent from reading of the following description which has been made in conjunction with the accompanying drawings.

BRIEF DESCRIPTION OF THE DRAWINGS

The present invention is illustrated in the following drawings in which.

DESCRIPTION OF THE PREFERRED EMBODIMENTS

Figure 1:
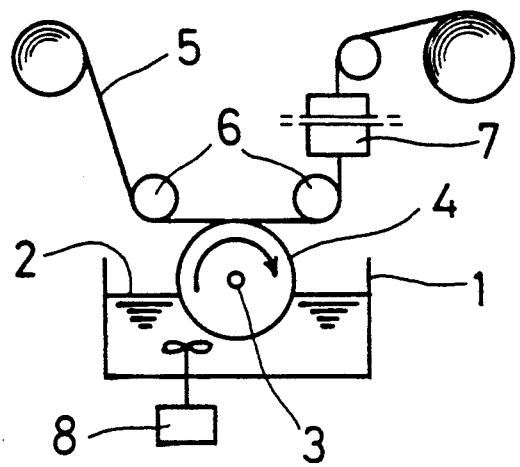
FIG. 1 is a diagrammatical view which schematically illustrates that a sheet-shaped raw material is adhesively coated with an aqueous treatment solution with the aid of a rotating drum of which part is always dipped in an aqueous treatment solution vessel.

Now, the present invention will be described in detail hereinafter with reference to the accompanying drawings which illustrate preferred embodiments of the present invention.

First, a method of producing a filtering material in accordance with a first embodiment of the present invention will be described below with reference to FIG. 1.

Porous apatite particles of 0.5 to 40% by weight and a water soluble glucan of 0.5 to 15% by weight are dispersively dissolved in water to prepare an aqueous treatment solution, and thereafter, a sheet-shaped raw material is adhesively coated with the resultant treatment solution with the aid of a rotating drum to be described later. After completion of the coating operation, the sheet material having the treatment solution adhesively coated thereon is dried. It is preferable that the porous apatite particles contained in the treatment solution in terms of percentages by weight is set to 0.5 to 30% by weight so as to prevent a product of filtering material from breaking during practical use for a long time due to shortage of flexibility thereof.

The reason why the content of the porous apatite particles in the treatment solution has been defined in the above-noted manner will be described below.

If the content of the porous apatite exceeds 40% by weight, air permeability of a product of filtering material is undesirably degraded. On the other hand, when it is set to 0.5% or less by weight, a capability of the filtering material for adsorptively capturing very fine infectious or antigenous particles such as virus, bacteria or the like is reduced, resulting in practicability of the filtering material being substantially lost.

In addition, it has been found that if the content of the porous apatite particles in the treatment solution exceeds 30% by weight, flexibility of a product of filtering material is substantially reduced. For this reason, the product of filtering material is not suitably employable as a material for, e.g., a mask. Obviously, however, in case that there is no need of bending it during practical use, it can be employed as a filtering material without any particular trouble.

Similarly, the reason why the content of the water soluble glucan in the treatment solution has been defined in the above-noted manner will be described below.

If the content of the water soluble glucan exceeds 15% by weight, air permeability of a product of filtering material is degraded. On the other hand, when it is set to 0.5% or less by weight, the capability of the filtering material for adsorptively capturing very fine infectious or antigeneous particles such as virus, bacteria or the like is excessively reduced, resulting in practicability of the filtering material being substantially lost.

With respect to the porous apatite particles, it is most acceptable that a porous hydroxyl calcium apatite (HAP), a porous fluorided apatite (FAP) or a mixture of HAP and FAP each having a pore diameter equal to or larger than a size of each very fine particle to be adsorbed thereinto is pulverized so as to allow the surface of each apatite particle to become porous. To practically produce the porous apatite particles, it is recommended that a gas generating substance such as a polyvinyl alcohol or the like is mixed with them before a sintering operation is performed for the porous apatite particles.

It is preferable that the porous apatite particles have a particle size ranging from 10 to 100 microns while they are distributed in size with an average particle size of 50 microns. The porous apatite particles having their particle size distributed in the above-described manner have a total surface area of 10 m² per one gram.

HAP particles, FAP particles and a mixture of them each of which is an inorganic particle and each of which surface is highly activated can adsorptively capture very fine antigenous particles such as small-sized bacteria (ultimately small cells), virus (DNA, RNA) or the like each having nuclearic acid molecules.

On the other hand, with respect to the water soluble glucan, it is recommended to use, e.g., a triose having a molecular weight of 30,000 to 300,000. The triose itself serves to adsorptively capture very fine infectious or antigenous particles each flying in the air. In addition, the triose contains molecules each interacting to bond the very fine particles to the surface of each fiber in a sheet-shaped raw material. Since the triose has an ample quantity of hydroxyls in the molecular structure thereof, it can adsorptively capture very fine particles such as spore, pollen, fungus or the like each having such a structure that the surface of each particle is covered with saccharide chains or muccopolysaccharides by the action of hydrogen bond or the like.

In detail, the method of the present invention includes a first step, i.e., a step of preparing an aqueous treatment solution by uniformly dispersively dissolving porous apatite particles of 0.5 to 40% by weight, preferably, 0.5 to 30% by weight and a water soluble glucan such as a triose or the like of 0.5 to 15% by weight in water.

In addition, the method of the present invention includes a second step, i.e., a step of coating a sheet-shaped raw material with the treatment solution prepared in the above-described manner with the aid of a rotating drum to be described later.

A woven cloth of natural fibers, synthetic fibers or a mixture of them, an unwoven cloth, a cotton-shaped fibrous material, a thin pulp based paper having air permeability and a Japanese traditional paper can be noted as typical materials employable for the sheet-shaped raw material.

Next, a coating unit for coating a sheet-shaped raw material with an aqueous treatment solution will be described below with reference to FIG. 1. As shown in the drawing, the coating unit includes a treatment solution vessel 1 in which an aqueous treatment solution 2 is contained. A drum 4 having a horizontally extending rotational shaft 3 is continuously rotated while a part of the drum 4 is always dipped in the vessel 1 so as to allow a part of the surface of the drum 4 to be wetted with the treatment solution 2 at all times.

A strip of sheet-shaped raw material 5 is wound around a mandrel (not shown) in the roll-shaped configuration, and a part of the sheet-shaped raw material 5 unwound from the roll is bridged between a pair of idle rollers 6 in such a manner as to come in contact with the drum 4. In the shown case, it is assumed that the sheet-shaped raw material 5 is unwound from the left-hand side to the right-hand side as seen in the drawing. A heater 7 for drying the sheet-shaped raw material 5 coated with the treatment solution 2 is arranged at the intermediate position of the passage along which the unwound sheet-shaped raw material 5 travels. It is assumed that the traveling speed of the sheet-shaped raw material 5 is set in such a manner as not to exceed the circumferential speed of the drum 4. This is because if the traveling speed of the sheet-shaped raw material 5 exceeds the circumferential speed of the drum 4, the treatment solution fails to be supplied to the sheet-shaped raw material 5 with the result that there arises a malfunction that a part of the sheet-shaped raw material 5 is not coated with the treatment solution.

As is apparent from the above description, a quantity of coating of the treatment solution with the sheet-shaped raw material 5 varies dependent on a difference between the circumferential speed of the drum 4 and the traveling speed of the sheet-shaped raw material 5. In the circumstances as mentioned above, the quantity of coating of the treatment solution with the sheet-shaped raw material 5 should be set so as to allow the latter to be sufficiently coated with the former. This is because if a part of the sheet-shaped raw material fails to be coated with the treatment solution, the foregoing part does not function as a filter after completion of a drying operation, and moreover, if another part of the same is excessively coated with the treatment solution, there arises a malfunction that the treatment solution uselessly drops from the sheet-shaped raw material 5. Alternatively, the sheet-shaped raw material 5 may be unwound in the reverse direction, i.e., from the right-hand side to the left-hand side as seen in the drawing, while the direction of rotation of the drum 4 is kept unchanged, i.e., the drum 4 is rotated in the clockwise direction.

Although the following technical concept does not constitute an essential structural requirement associated with the method of the present invention, it is recommendable that the treatment solution 2 is always stirred by rotating a stirrer 8 so as to assure that the porous apatite particles do not settle in the treatment vessel 1.

In addition, the method of the present invention includes a third step, i.e., a drying step to be achieved after the sheet-shaped raw material 5 is coated with the treatment solution 2 in the above-described manner. On completion of the drying step, a required filtering material is obtained. The coated sheet-shaped raw material 5 may naturally be dried at a room temperature. However, to improve an efficiency of the drying operation, it is recommended to positively dry the sheet-shaped raw material 5 by continuously conveying it in the heater 7 as illustrated in FIG. 1.

After completion of the drying step, a product of filtering material in the form of a strip is successively cut into pieces each of a rectangular shape having dimensions of e.g., 10 cm×5 cm so that each rectangular piece is used as an element for producing a mask.

Additionally, although the following technical concept does not constitute an essential structural requirement associated with the method of the present invention, it is desirable that the coated sheet-shaped raw material is heated and pressed by an opposing pair of hot rolls at an elevated temperature of about 150° C. by forcibly causing it to pass between the hot rolls so as to thermally set it. This is because connecting or bonding between the porous apatite particles and fibers attributable to weak hydrogen bond, electrostatic bond or the like is liable to break, with the exception of the porous apatite particles tightly impregnated between adjacent fibers in the sheet-shaped raw material, as the product of filtering material is repeatedly bent during practical use. The foregoing thermal setting operation is intended to physically reinforce the readily broken bonding therebetween by heating and pressing the fiber network structure in the sheet-shaped raw material. Once the sheet-shaped raw material has been thermally set, there is no possibility that bond water escapes from the sheet-shaped raw material but only free water is vaporized therefrom, resulting in an adsorbing capability of a mask piece having the filtering material employed therefor being improved. When the sheet-shaped raw material is subjected to hot pressing, the porous apatite particles forcibly or additionally forcibly penetrate into the fibrous structure of the sheet-shaped raw material, resulting in a physical property of the filtering material being improved.

Next, a method of producing a filtering material in accordance with a second embodiment of the present invention will be described below with reference to FIG. 2.

A water soluble glucan of 0.5 to 25% by weight is dissolved in water to prepare an aqueous treatment solution. In this embodiment, the foregoing process is defined as a first step.

In addition, the method of the present invention includes a second step, i.e., a step of allowing a sheet-shaped raw material to be adhesively coated with the treatment solution prepared in that way.

To achieve the second step, it is recommended that the sheet-shaped raw material is dipped in a bath of treatment solution and then upwardly drawn away therefrom in the same manner as the process disclosed in an official gazette of the applicant's prior invention of Japanese Patent Application No. 278487/1990.

Alternatively, the second step may be achieved by spraying the treatment solution over one surface of the sheet-shaped raw material in the same manner as the process disclosed in an official gazette of the applicant's prior invention of Japanese Patent Application No. 29301/1991.

Additionally, the second step may be achieved such that the sheet-shaped raw material is adhesively coated with the treatment solution with the aid of a rotating drum of which part is always dipped in a bath of treatment solution contained in a treatment solution vessel in the same manner as in the first embodiment of the present invention (see FIG. 1).

In addition, the method of the present invention includes a third step, i.e., a step of adhesively depositing a predetermined quantity of porous apatite particles on the sheet-shaped raw material before the treatment solution adhesively coated with the treatment solution on the sheet-shaped raw material is completely dried. To achieve the third step, it is recommended that a sifter having a certain quantity of porous apatite particles placed thereon is caused to oscillate in the horizontal direction so as to allow them to be dispersed over one surface of the sheet-shaped raw material.

In case that a degree of drying of the treatment solution on the sheet-shaped raw material is low, i.e., in case that the sheet-shaped raw material is still wet at the time directly after it is adhesively coated with the treatment solution, the foregoing dispersing process is preferably employed for softly depositing the porous apatite particles on the sheet-shaped raw material. This is because if porous apatite particles are intensely dispersed over one surface of the sheet-shaped raw material by the action of air blowing while the sheet-shaped raw material is sufficiently wetted with the treatment solution, they penetrate into the treatment solution with the result that after the wet sheet-shaped raw material is dried, each porous apatite particle is fully surrounded by the glucan, causing the number of porous apatite particles capable of adsorptively capturing infectious or antigeneous very fine particles to be undesirably reduced.

In some case, it is advantageously employed dependent not only on a degree of drying of the treatment solution on the sheet-shaped raw material but also on the kind of the latter that the porous apatite particles are sprayed over one surface of the sheet-shaped raw material rather than dispersion of the former over the latter.

To practice the method of the present invention at a high efficiency, it is acceptable that moisture in the treatment solution is quickly removed therefrom e.g., by vaporization so as to shorten the time required for completing the whole steps. However, employment of the vaporization process leads to the result that the treatment solution is half dried in the course of a series of steps, resulting in the porous apatite particles hardly adhering to the sheet-shaped raw material. In such case, it is recommended that the porous apatite particles are adhesively deposited over one surface of the sheet-shaped raw material by employing the spraying process with the aid of air blowing.

In case that the sheet-shaped raw material is a pulp based paper or a Japanese traditional paper, while the porous apatite particles are dispersively deposited over one surface of the sheet-shaped raw material, there is a possibility that the former are disjointedly peeled away from the latter when an operator rubs the surface of the sheet-shaped raw material with his hand. In such case, it is advantageously acceptable that the porous apatite particles penetrate into the fibrous structure of the paper or the half dried treatment solution by utilizing the kinematic energy generated by spraying the porous apatite particles over one surface of the sheet-shaped raw material. Consequently, the porous apatite particles can stably adhesively be deposited on the sheet-shaped raw material.

Figure 2:
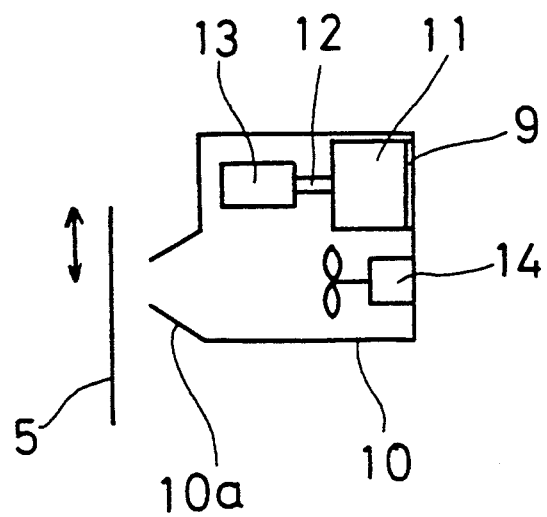
FIG. 2 is another diagrammatical view which schematically illustrates that a predetermined quantity of porous apatite particles are adhesively deposited on a sheet-shaped raw material having an aqueous treatment solution adhesively coated thereon by spraying them over one surface of the sheet-shaped raw material by the action of air blowing.

FIG. 2 is a diagrammatical view which schematically illustrates the structure of a spraying unit for spraying porous apatite particles over one surface of a sheet-shaped raw material. Specifically, a vibrator 11 is mounted on the inner wall surface of a case 10 with a vibration-proofing material 9 interposed therebetween, and a sifter 13 including a sifter screen having a fine mesh size is operatively connected to the foremost end of an output shaft 12 of the vibrator 11. A certain quantity of porous apatite particles are placed on the sifter screen, and thereafter, the vibrator 11 is activated. As the vibrator 11 operates, the porous apatite particles which have passed through the sifter screen fall down from the vibrator 11 and they are then blown in the horizontal direction by the action of air stream generated by a blower 14 located below the vibrator 11 to intensely collide against a sheet-shaped raw material 5 after they pass through a discharge port 10a on the case 10.

A small-sized sand blasting machine may be employed for the purpose of spraying porous apatite particles over one surface of the sheet-shaped raw material.

It is reasonable that a quantity of adhesive deposition of porous apatite particles on an unit area of 1 m² of the sheet-shaped raw material is set to 5 to 100% based on an unit deposition quantity on the sheet-shaped raw material (representing a weight of the porous apatite particles on an unit area of 1 m² of the sheet-shaped raw material).

In addition, the method of the present invention includes a fourth step which is coincident with the third step (drying step) in the first embodiment of the present invention. Thus, for the purpose of simplification, repeated description on the fourth step will not be required.

Although the following technical concept does not constitute an essential structural requirement associated with the method of the present invention, it is desirable that the sheet-shaped raw material adhesively coated with the treatment solution is heated and pressed by an opposing pair of rolls at an elevated temperature of about 150° C. by forcibly causing it to pass between the hot rolls so as to thermally set it.

EXAMPLE 1

A few samples were prepared using a filtering material produced by employing the method of the present invention so as to conduct a series of tests. A suspension containing influenza virus (A/PR/8) was caused to pass through each sample of the filtering material. Then, a virus titer of the suspension which had passed through the filtering material was detected after a hemagglutination reaction and a neutralization reaction were completed using a chicken as a test animal. The results obtained from the foregoing tests are shown in Table 1. A blank part in a column "sample" in the table designates a case that the suspension containing influenza virus could not pass through the filtering material by any means.

Here, the hemagglutination reaction refers to a reaction for allowing the chicken's cells to be coagulated together in the presence of the influenza virus, and the presence of absence of the influenza virus can be detected based on the result presenting the presence or absence of the same after completion of the hemagglutination reaction. The result representing a virus titer of 256 shows that coagulation took place even when the suspension which had passed through the filtering material was diluted with a saline by a quantity of 256 times.

In addition, the neutralization reaction refers to a reaction for allowing the influenza virus to destroy lung cells of a human's embryo when it adheres to them, and a numeral of $10^4$ representing the virus titer shows the number of destroyed cells.

TABLE 1

| | virus titer | |
| --- | --- | --- |
| sample | hemagglutination reaction | neutralization reaction (PFU) |
| blank | 256 | $10^4$ |
| unwoven cloth | 256 | $10^4$ |
| filtering material of the present invention | 32 | less than 10 |

EXAMPLE 2

Another tests were conducted using the filtering material produced by employing the method of the present invention. Suspensions each containing bacteria, i.e., *Escherichia coli*, Staphylococcus aureus and Pseudomonas aeruginosa were caused to pass through the filtering material. The results obtained from the foregoing tests are shown in Table 2. Each of the results represents a capability of adsorptively capturing bacteria in each suspension by the filtering material produced by employing the method of the present invention. It should be noted that the number of bacteria contained in each suspension prior to flowing of the same through the filtering material was $10^6$.

As is apparent from the table, the filtering material produced by employing the method of the present invention permits few bacteria to pass therethrough.

TABLE 2

| sample | the number of bacteria which passed through the filtering material | | |
|---|---|---|---|
| | Escherichia coli | Staphylococcus aureus | Pseudomonas aeruginosa |
| sheet-shaped paper | $10^5$ | $10^5$ | $10^5$ |
| unwoven cloth | $10^5$ | $10^5$ | $10^5$ |
| filtering material (sheet-shaped paper used as a sheet-shaped raw material) | less than 10 (detection failed) | less than 10 | less than 10 |
| filtering material (unwoven cloth used as a sheet-shaped raw material) | less than 10 | less than 10 | less than 10 |

In addition, another tests were conducted using the filtering material produced by employing the method of the present invention so as to evaluate a deodoring capability of the filtering material in the stationary state. In practice, the deodoring capability of the filtering material was evaluated in the stationary state in such a manner that an odoring substance having an initial concentration (e.g., 100 ppm or 50 ppm) and a square filtering material having dimensions of 10 cm×10 cm were received in a tetrabag having a capacity of three liters and the present concentration of the odoring substance was then measured (by using a detecting tube). The results obtained by the measurements are shown in Table 3. Numerals on the table represent the results obtained in that way by way of ppm in unit.

TABLE 3

| odoring substance | concentration measured at measuring time (ppm) | | |
|---|---|---|---|
| | zero minute | one minute | two minute |
| ammonia | 100 | 3 | 0 |
| hydrogen sulfide | 100 | 5 | 0 |
| trimethylamine | 100 | 5 | 0 |
| methyl mercaputan | 100 | 20 | 8 |
| phenol | 50 | 5 | 0 |
| acetaldehyde | 50 | 10 | 2 |
| valeric acid | 50 | 20 | 0 |
| acetic acid | 50 | 8 | 0 |
| ethylene oxide | 50 | 4 | 0 |

EXAMPLE 4

Additionally, another tests were conducted using the filtering material produced by employing the method of the present invention so as to evaluate a deodoring capability of the filtering material which was practically evaluated by measuring both of the air permeability and the deodoring capability of the filtering material. In practice, the air permeability and the deodoring capability of the filtering material were evaluated in such a manner that an air stream containing an odoring substance having an initial concentration (e.g., 100 ppm or 50 ppm) was caused to pass through the filtering material and a concentration of the odoring substance after completion of the passage of the odoring substance through the filtering material was then measured. The results obtained by the measurements are shown on Table 4. Numerals on the table represent the deodoring capability by way of ppm in unit.

Specifically, a tetrabag having a capacity of three liters for supplying an air stream was connected to another tetrabag having a capacity of three liters for recovering the supplied air stream via an air venting tube, a pump, a flow meter and a holder for holding the filtering material were arranged along the air venting tube in accordance with the order as seen from the air stream supply side. As the pump was driven, an air stream containing an odoring substance was forcibly caused to pass through the filtering material held by the holder, and a concentration of the odoring substance on the recovery side was then measured by using a detecting tube. It should be noted that the measurements were conducted under conditions that a flow rate of the air stream was set to one liter/minute and an air permeable surface area of the filtering material held by the holder was set to 15 cm². In addition, a differential pressure shown on the table represents a difference between the pressure of the air stream before it reached the filtering material and the pressure of the same after it passed through the filtering material.

TABLE 4

| odoring substance | filtering material | concentration before air passage | concentration before air passage | differential pressure (at.) |
|---|---|---|---|---|
| ammonia | unwoven cloth | 100 | 60 | 6.0 |
| | filtering material of the present invention | 100 | 5 | 6.2 |
| trimethylamine | unwoven cloth | 100 | 70 | 6.1 |
| | filtering material of the same | 100 | 2 | 6.1 |
| hydrogen sulfide | unwoven cloth | 100 | 60 | 6.0 |
| | filtering material of the same | 100 | 4 | 6.1 |
| ethylene oxide | unwoven cloth | 50 | 40 | 6.0 |
| | filtering material of the same | 50 | 2 | 6.1 |

It should of course be understood that the present invention should not be limited only to the aforementioned two embodiments but various changes or modifications may be made departure from the scope of the present invention as defined by the appended claims.

For example, to improve the connectability of fibers in the sheet-shaped raw material to two components, i.e., the porous apatite particles and the glucan, e.g., a polyvinyl alcohol having a small number of molecules may be added to the filtering material. In addition, to improve microbicydal activity of the filtering material, each of metals such as Zn, Cu, Ag or the like each having excellent microbiocidal activity and serving as a fourth component may be substituted for Ca in HAP constituting the filtering material. Otherwise, it may be inserted between adjacent crystal lattices of HAP. In other words, HAP having excellent microbicydal activity may be added to the filtering material so as to improve a microbicydal property of the same.

What is claimed is:

1. A method of producing a filtering material, comprising:
   a first step of preparing an aqueous treatment solution by dispersing porous apatite particles of 0.5 to 40% by weight and dissolving a water soluble glucan of 0.5 to 15% by weight in water,
   a second step of adhesively coating a sheet-shaped raw material with said aqueous treatment solution by means of rolling means, and
   a third step of drying said sheet-shaped raw material having said aqueous treatment solution adhesively coated thereon.

2. The method as claimed in claim 1, wherein said porous apatite particles are present in said aqueous treatment solution in an amount of to 0.5 to 30% by weight.

3. The method as claimed in claim 1 or 2, wherein said rolling means is a rotating drum of which part is always dipped in a treatment solution vessel in which said aqueous treatment solution is contained, said drum being rotated at a circumferential speed equal to or higher than a travelling speed of said sheet-shaped raw material.

4. A method of producing a filtering material, comprising in the following order:
   a first step preparing an aqueous treatment solution by dissolving a water soluble glucan of 0.5 to 25% by weight in water,
   a second step of adhesively coating a sheet-shaped raw material with said treatment solution,
   a third step of adhesively depositing porous apatite particles on said sheet-shaped raw material before said aqueous treatment solution adhesively coated on said sheet-shaped raw material is completely dried, said porous apatite particles being deposited in an amount sufficient to permit a thus-treated sheet-shaped raw material to adsorb infectious or antigenous particles and
   a fourth step of drying said sheet-shaped raw material having said aqueous treatment solution adhesively coated thereon and said porous apatite particles adhesively deposited thereon.

5. The method as claimed in claim 4, wherein said second step is achieved by dipping said sheet-shaped raw material in said aqueous treatment solution and then upwardly drawing the former away from the latter.

6. The method as claimed in claim 4, wherein said second step is achieved by spraying said aqueous treatment solution over one surface of said sheet-shaped raw material.

7. The method as claimed in claim 4, wherein said second step is achieved by allowing a rotating drum to come in contact with said sheet-shaped raw material, a part of said rotating drum being always dipped in said aqueous treatment solution, and a circumferential speed of said rotating drum being set to be equal to or higher than a traveling speed of said sheet-shaped raw material.

8. The method as claimed in any one of claims 4 to 7, wherein said third step is achieved by distributing said porous apatite particles over one surface of said sheet-shaped raw material.

9. The method as claimed in any one of claims 4 to 7, wherein said third step is achieved by spraying said porous apatite particles over one surface of said sheet shaped raw material by action of air blowing.

* * * * *